United States Patent [19]
Haberl

[11] 4,296,345
[45] Oct. 20, 1981

[54] FLEXIBLE LOOP SLIP RING BRUSH

[75] Inventor: John B. Haberl, Dalton, Mass.

[73] Assignee: The United States of America as represented by the Secretary of the Navy, Washington, D.C.

[21] Appl. No.: 167,866

[22] Filed: Jul. 14, 1980

[51] Int. Cl.³ .............................................. H02K 13/00
[52] U.S. Cl. ..................................... 310/219; 310/238
[58] Field of Search ............... 310/219, 230, 238, 232; 339/5, 8

[56] References Cited

U.S. PATENT DOCUMENTS

| | | | |
|---|---|---|---|
| 284,255 | 9/1883 | Stockwell | 310/238 X |
| 421,320 | 2/1890 | Schmid et al. | 310/238 |
| 515,613 | 2/1894 | Roberts | 310/238 |
| 1,876,235 | 9/1932 | Ito | 310/219 |
| 2,276,983 | 3/1942 | Jonas | 310/219 |

*Primary Examiner*—Donovan F. Duggan
*Attorney, Agent, or Firm*—R. S. Sciascia; Sol Sheinbein; Philip Schneider

[57] ABSTRACT

Flexible wire loop slip ring brushes for use in miniaturized gyroscopes. A plurality of flexible wire loop brushes hug or embrace opposite peripheral sides of respective slip rings in resilient sliding contact over a substantial arc for establishing a redundancy of "a" spots for assured paths through which electrical current may pass with minimal resistance. The rings and the brushes are gold alloy which in sliding contact provide good electrical conductivity and low noise.

20 Claims, 13 Drawing Figures

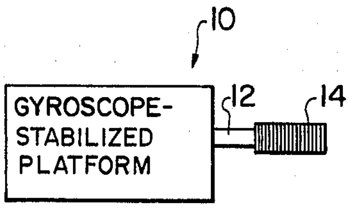
FIG. 1
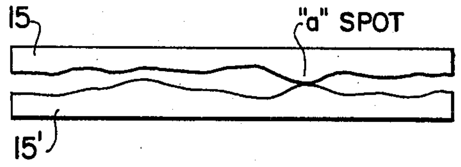
FIG. 2
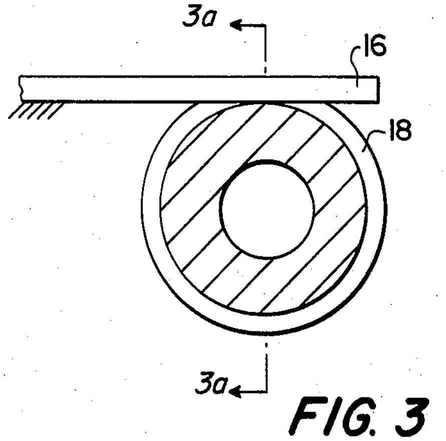
FIG. 3
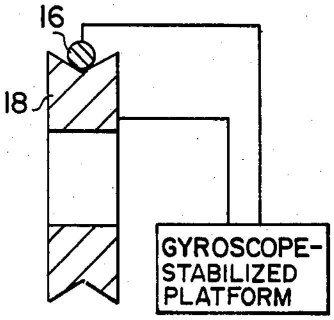
FIG. 3a
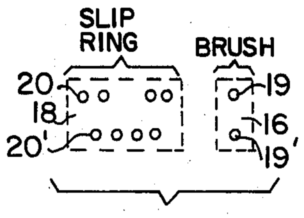
FIG. 3b
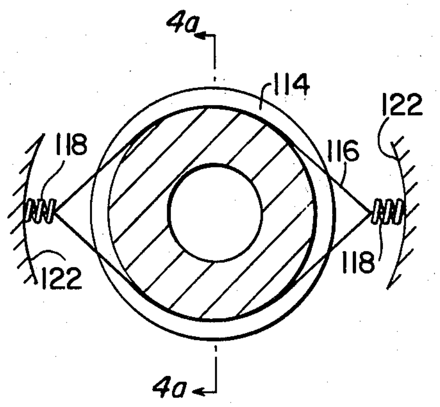
FIG. 4
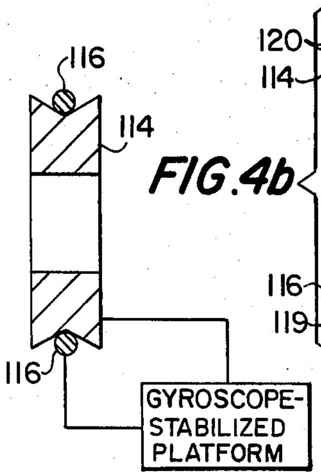
FIG. 4a
FIG. 4b
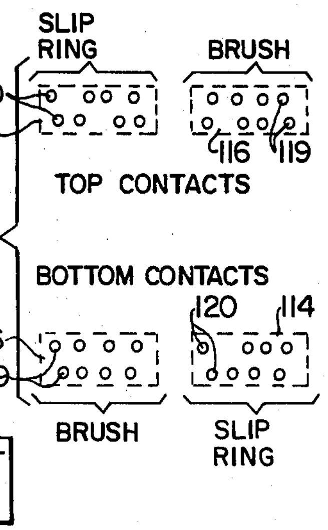

FLEXIBLE LOOP SLIP RING BRUSH

BACKGROUND OF THE INVENTION

Electrical conduction between brushes and slip rings have long encountered problems relating to frictional drag, noise, electrical resistance and even open circuits due to chemical film or physical fouling of contact points by foreign debris. These problems, particularly open circuits, have been magnified with miniaturization.

Electrical conduction through mechanically mating contact members does not occur over a continuous or substantial area. All fabricated structures have some degree of surface roughness, and when two such surfaces are brought into mechanical contact they actually touch only where their peaks (asperities) on opposing topographies coincide to a define "a" spots. As contact force on the structures is increased, the asperities are deformed, thus increasing individual "a" spot areas, and allowing other asperities to begin making contact. In practice, increasing contact force does not ultimately achieve total area contact.

The flow of electrical current from one contact member to another is constrained to mating "a" spots, thereby giving rise to a constriction resistance due to the decreased conductive area in the contact interface. In addition to constrictive resistance, there are always, except in perfect vacuum, films of various types which contribute additional resistance. These films may cause a contact to perform poorly, or fail altogether. Relative movement between the members cause wear at their interfacing "a" spots. Some beneficial effects of wear are that mating contacts become fitted to each other, thereby smoothing the surface and increasing contact area. A deleterious effect is that the wear creates debris, causing intermittent performance and electrical shorts between adjacent circuits.

These factors must be taken into consideration in the design of miniaturized precision slip rings and brushes for inclusion on gyroscopes used in inertial guidance systems where frictional drag, noise, resistance to current flow, and an environment free of foreign bodies are important considerations. In considering loop brush designs for miniaturized gyroscopes there are trade-offs in brush wire sizes, brush tension, noise, wear, and angle of brush wrap about the slip ring.

One design of a miniaturized slip ring and brush design is disclosed in U.S. Pat. No. 3,396,586. While this patent is primarily concerned with a method of assembling slip rings with a plurality of axially-spaced brushes, it discloses slip rings being contacted by a plurality of axially spaced brushes which are pieces of spring tempered round wire sections bent to a U-shape, the legs of which make point contact on opposite sides of each slip ring.

Typical wire brush arrangement in the prior art employ U-shaped round leg brushes riding in V-groove slip rings which provided a maximum of four junctures per circuit. It is obvious that contact spots which are commonly only a few micrometers in diameter are quite susceptible to contamination. Airborne dusts, for example, are common in size range of one to 20 micrometers, and bacteria may be about one micrometer in diameter. Other physical interference by free bodies, such as from abraded parts and organic vapors, add to the problem of maintaining electrical contact through the "a" spots.

SUMMARY OF THE INVENTION

The invention is generally concerned with establishing reliable electrical contact between relatively moving conductors by employing a redundancy of contacting spots. More specifically, the invention is directed to extremely flexible wire loop brushes wrapped about rotating slip rings on miniaturized gyroscope-stabilized platforms for making electrical contact therewith. The slip rings are made up of a plurality of preferably gold washers. They are axially stacked on a rotatable shaft, and are electrically insulated from one another. A plurality of wire loop brushes are provided for contacting respective washers (rings), each completing a circuit between stationary and moving parts of the gyroscope-stabilized platform. Each brush and washer establishes a redundancy in contacting "a" spots. The brushes are formed of a small diameter gold alloy wire such as ASTM B541 (which includes platinum, silver and copper). The loop wires are provided with means for establishing resiliency by contracting the loop whereby the wires are caused to resiliently hug or embrace peripheral arcs on the slip ring peripheries. This compensates for wear and thermal expansion and contraction of the loop due to temperature changes.

OBJECTS OF THE INVENTION

With the foregoing in mind, it is an object of the invention to provide a flexible wire loop slip ring brush.

It is another object of the invention to provide flexible small diameter wire loop slip ring brushes whose opposed runs wrap around substantial arcs of ring periphery in line contact.

It is still another object of the invention to provide flexible wire loop slip ring brushes having low noise, low electrical resistance and a redundancy of contact spots about the periphery of the slip rings.

It is yet another object of the invention to provide gold alloy flexible wire slip ring brushes for use with gold slip rings.

It is yet still another object of the invention to provide flexible wire slip ring brushes with resilience for contracting into embracement with the slip rings at a contact tension relatively independent of temperature fluctuations.

BRIEF DESCRIPTION OF THE DRAWINGS

FIG. 1 is a schematic representation of a miniaturized gyroscope-stabilized platform with slip rings carried on a rotatable shaft.

FIG. 2 is a representation of contact interface between two mechanically mating members in electrical contact.

FIG. 3 is a representation of a typical prior art cantilevered resilient brush in electrical point contact on a slip ring.

FIG. *3a* is a cross-sectional representation taken generally along line 3—3 of FIG. 3, and illustrating an electrical circuit and contacts between the ring and brush.

FIG. *3b* is a representation of contact points (potential "a" spots) on the cantilevered wire brush and slip rings of FIGS. 3 and *3a*.

FIG. 4 shows a flexible wire loop brush, according to the present invention with opposed legs or runs embracing substantial peripheral arcs of a slip ring.

FIG. 4*a* is a cross-sectional view taken generally along line 4—4 of FIG. 4, and illustrating an electrical circuit and contacts between the ring and brush.

FIG. 4*b* is a representation of a line of contact points (potential "a" spots) on the flexible wire loop brush and slip ring.

Figure 5:
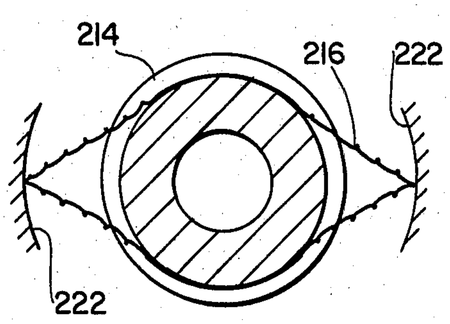

FIG. 5 is an alternate embodiment of a flexible loop brush shown mounted on a slip ring.

Figure 6:
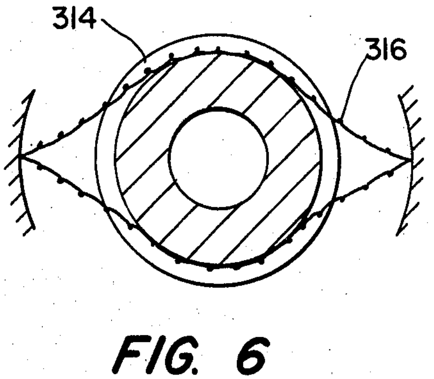

FIG. 6 is another alternate embodiment of a flexible loop brush shown mounting a slip ring.

Figure 7:
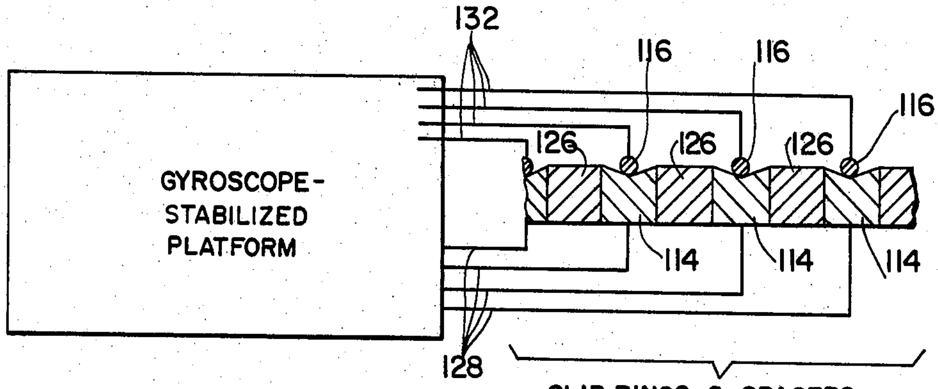

FIG. 7 is a fragmented cross-sectional view (greatly enlarged) taken longitudinally through a plurality of slip rings and brushes and illustrating circuits with the gyroscope-stabilized platform.

Figure 8:
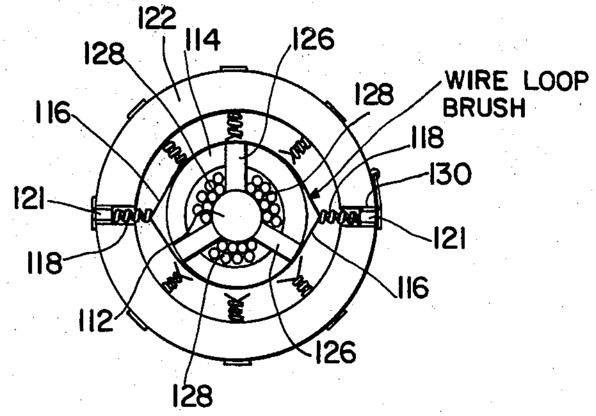

FIG. 8 is an end view of the slip-ring rotor and stator.

Figure 9:
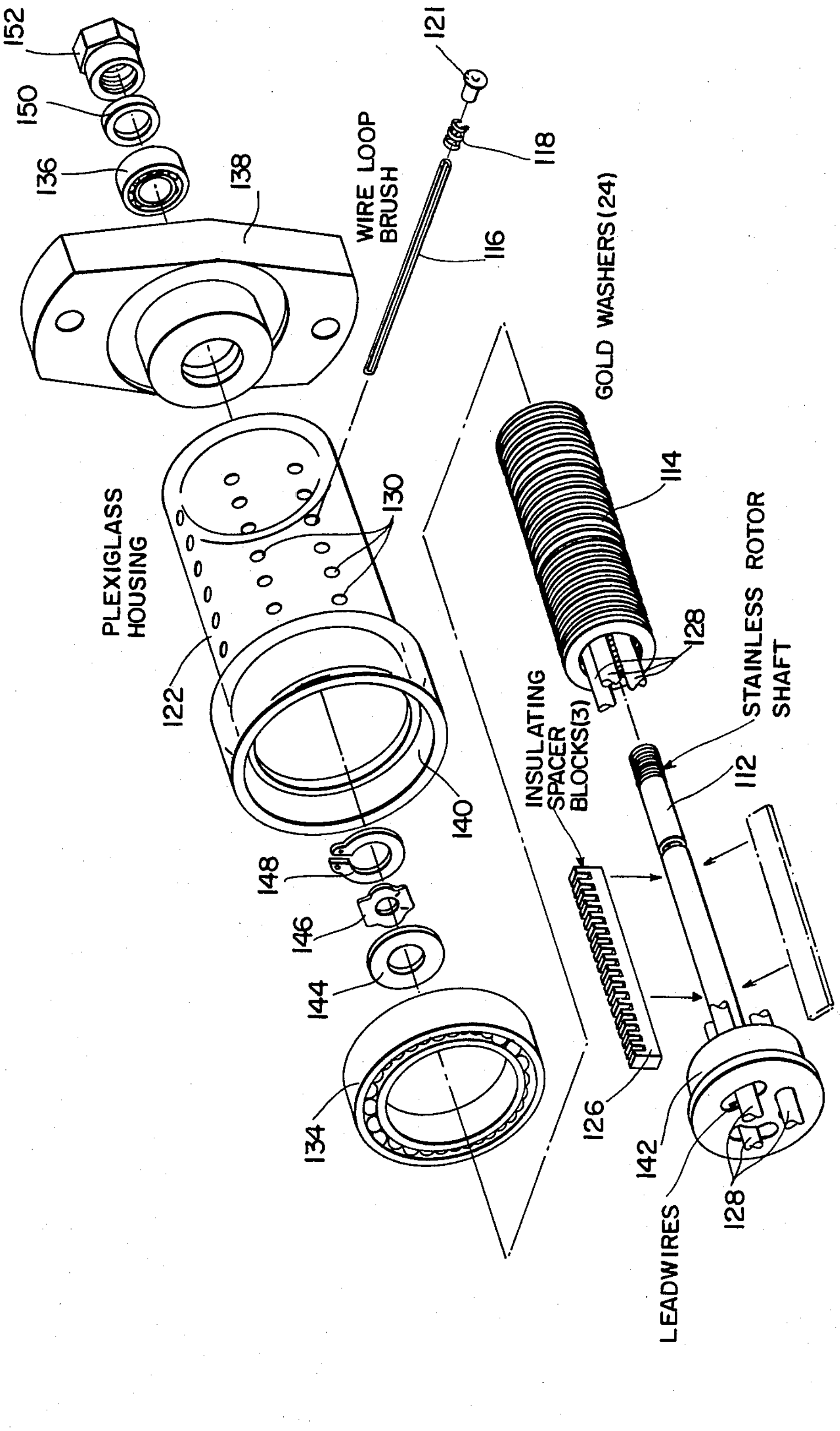

FIG. 9 is an exploded view of elements of the slip-ring rotor and stator.

DESCRIPTION OF THE PREFERRED EMBODIMENTS

Like numerals are applied throughout the several drawing figures, where possible, to identify like or similar elements and features. In FIG. 1 there is shown in general representation a minaturized gyroscope-stabilized platform 10 including a gimbal axis 12 on which is mounted a stack of slip ring washers 14 about which flexible loop brushes (not shown), according to the present invention, are adapted to be wrapped in sliding electrical contact.

FIG. 2 illustrates in enormous magnification the surface topographies and interface between two contact members, 15 and 15'; such as a brush and slip rings, through which electrical current is passed. Even though electrically conducting surfaces are apparently smooth, actual electrical contact is made only through minute contacts known as "a" spots. The design provided by the present invention attempts to bring a redundancy of such contacts into cooperation so that fouling of one will not interfere with current flow through others, thus assuring continuous operation. The "a" spot contacts will be discussed in more detail with reference to FIGS. 3*b* and 4*b*.

FIGS. 3 and 3*a* are provided to illustrate a typical prior art brush-ring arrangement where a cantilevered spring wire brush 16 resiliently bears at a maximum of two areas against a V-groove peripheral surface of rotary slip ring 18 for establishing current paths therebetween. FIG. 3*b* illustrates two asperities 19, 19' on fixed brush 16. FIG. 3*b* further illustrates two lines of randomly aligned asperities 20, on slip ring 18 adapted to move in the direction indicated by the arrow toward two asperities 19, on the brush. To have continuous electrical flow between the brush and ring, it is necessary that "a" spots exist between at least one of the asperities 19 and 20 or 20' at all times. As shown in FIG. 3*b*, fouling of only one "a" spot may cause a momentary open circuit, if other asperities on the slip ring are not yet in mating position. This is a shortcoming of the prior art. A redundancy is built into the arrangement of the present invention by the plurality of aligned asperities on both brush and ring.

For illustrating the invention, FIG. 4 is a greatly enlarged cross-sectional view of the slip ring 114 encircled or surrounded by opposed runs of flexible wire loop brush 116 in sliding electrical contact on two opposite arcs of 60 to 90 degrees each. Contact is maintained by tensile forces applied to the wire sections. As illustrated in FIG. 4, resilient means such as helical coils 118 encircle opposed portions of the loops adjacent their attachment to housing 122 and apply tensile forces on the wire sections for contracting the loop for sustained resilient contacts with the slip ring periphery.

To provide some idea of the sizes of slip-rings and brushes on a miniaturized gyroscope, slip-ring 114 has an outside diameter of 0.260" and a thickness of 0.011", and the brush wires have a diameter of 0.002" to 0.004". With these small dimensions, the problem of maintaining uninterrupted sliding electrical contact between the slip-ring peripheries and brushes will be appreciated.

FIG. 4*a* is an enlarged cross-sectional representation of FIG. 4 for illustrating top and bottom contact of the wire of loop brush 116 with the V-shaped periphery of slip-ring 114. Both top and bottom contacts are along extended lines. A random pattern of their facing asperities are illustrated in great enlargement in FIG. 4*b*. Previous discussion has dealt with these asperities and how they mate in redundancy for assured continuous electrical contact. In FIG. 4*b* there is illustrated random patterns of asperities 119 and 120 for both top and bottom contacts of the wire brush. The top of slip-ring 114 is illustrated as moving to the right, and the bottom is illustrated as moving to the left. It will be appreciated that over four lines of contact plural asperities, though in random patterns, mate in sufficient redundancy to establish and maintain continuous electrical flow therebetween. This is the advantage of line contact over point contacts illustrated in FIG. 3*b*.

Alternate embodiments of the loop brushes are illustrated in FIGS. 5 and 6. In each, the loops are formed of flexible wires having helical turns of sinusoidal formations along their lengths. In FIG. 5 loop brush 216 has turns of formations only at its opposite portions between slip ring 214 and housing 222. In FIG. 6, the turns or formations extend throughout loop brush 316, including its contact with slip ring 314. When the wire is stretched these turns of formations provide linear resiliency to the wire whereby portions or runs of the wire intermediate the anchored portions are caused to hug or embrace opposite sides of the slip-ring periphery much in the same manner as coil spring 118 in FIGS. 4 and 9, for example.

In FIG. 7 there is shown a fragmented cross-sectional view (greatly enlarged) taken through a plurality of slip-ring 114 and brushes 116. The slip-rings are stacked axially on a shaft (not illustrated) and spaced from one another by insulating spacer blocks 126. Circuits with wire leads 128 and 132 are completed between the rings and brushes.

FIG. 8 shows an end view assembly of the slip-rings and brushes carried in a housing. Reference may be made to FIG. 9 for detailed identification of the several components of the assembly in FIG. 8. A rotor section consists of a shaft 112, preferably formed of stainless steel, three insulating spacer blocks 126, which rest upon it, and a number of washer-shaped slip-rings 114 (24 in the model described) which rest in grooves in the spacer blocks. Lead wires 128 are attached to the slip-rings at their inside diameters and extend out of the end of the rotor through gaps between the three insulating spacer blocks. These lead wires are also identified in FIG. 7. The stator section comprises a cylindrical or tubular housing 122 of dielectric material, preferably transparent plastic, such as plexiglass, with paired holes 130 through diametrically opposed walls. Adjacent pairs of holes are axially spaced or separated and helically stepped in about 45° increments from one another.

Flexible wires defining brushes are strung between opposite holes so that opposed portions or runs surround a slip-ring and resiliently contact opposite peripheral portions thereof. The dielectric material electrically insulates the brushes from one another.

The various components making up the rotor and stator assemblies are shown in exploded view in FIG. 9. As previously mentioned, the stator section is made up of a cylindrical housing 122 mounted on mounting flange 138 and is provided with holes 130 through its walls for mounting opposite ends of wire loop brushes 116. Shaft 112, which carries slip-rings 114 and insulating spacer blocks 126, is adapted to be rotatably mounted in the stator by spaced apart anti-friction bearings 134 and 136. Bearing 134 is received in bellmouth opening 140 in one end of housing 122, and bearing 136 is received in mounting flange 138. Adapter head 142, carried on shaft 112, is received within the inner face of bearing 134 to rotatably mount shaft 112. Washers 144, 146 and retaining ring 148 cooperate with washer 150 and nut 152 to retain the slip-rings in assembly on shaft 112.

The wire loop brushes 116 (as many as 24) are initially installed in the cylindrical housing by inserting two parallel wires through opposing holes 130. The wires are then spread apart by a suitable mandrel to allow insertion of the rotor assembly. Initial conformance of the wire loops to hug opposite sides of the slip-ring peripheries is established by tensioning the wires to predetermined loads. Coil springs 118 and eyelets 121, respectively, are loosely riding on the wires outside housing 122 at this time. With wire 116 tension maintained, the eyelets are seated in holes 130 with helical springs 118 disposed about flexible wire rungs as shown in FIG. 8. Wires 116 are then welded or soldered to the eyelets. External lead wire 132 are connected at this time to wire 116 or to the eyelets. It is obvious that the flexible wire making up the brush may be formed either as an endless loop or comprised of two separate runs having their opposite ends, portions or extremities secured to the housing in a manner to also form a loop. It is preferred that housing 122 have its walls formed of a clear material to aid visual assembly of the intricated parts. It is essential that whatever material is selected for the housing must provide electrical insulation between holes 130 so that there is no current leakage between the brushes. The wire portions in actual sliding contact with the slip-ring require no lubrication, thus eliminating a very serious problem area with devices in current use.

The alternate embodiments in FIGS. 5 and 6 provide for loop contracting by tensioning the wires by stretching them and, with their use, coil springs 118 may be eliminated.

The slip-rings are preferably formed of gold alloy for excellent conductivity, absence of corroding, and acceptable wear properties. The brushes are preferably formed from gold alloy wire (ASTM B541) having a diameter of two or four thousandths of an inch. Together they provide for good conduction and low noise.

There has been disclosed preferred embodiments of the invention. It will be obvious that variations may be made to parts and features disclosed without departing from the spirit of the invention, and it is meant for the invention to be limited only by the scope of the appended claims.

What is claimed is:

1. A brush for making electrical contact with peripheral portions of a slip ring rotatable within a housing comprising:

flexible wire means having opposite extremities anchored at locations diametrically opposite the slip ring; said wire means having helical formations therein and including opposed runs defining a loop when passed on opposite sides of the slip ring, said wire means being stretched so that compressive force is exerted by the wire means to resiliently contract the loop whereby the opposed runs are caused to embrace substantial arcuate peripheral portions on opposite sides of the slip ring defining a brush for sliding electrical contact therewith.

2. The invention according to claim 1 wherein the runs embrace peripheral arcs in the range of 60° to 90° on opposite sides of the slip ring.

3. The invention according to claim 1 wherein the means acting to resiliently contract the loop comprises resilient means encircling of portion of the wire means adjacent its anchor to the housing.

4. The invention according to claim 3 wherein the resilient means is a coil spring.

5. The invention according to claim 1 wherein the helical formations are throughout the runs.

6. The invention according to claim 1 wherein the means acting to resiliently contract the loop comprises sinusoidal formations in the runs.

7. The invention according to claim 6 wherein the sinusoidal formations are throughout the runs.

8. A brush and slip ring arrangement comprising:

a slip ring carried on a shaft rotatably mounted coaxially within a cylindrical housing;

flexible wire means having opposed runs defining a loop surrounding at least a portion of the slip ring periphery and having helical formations in the runs;

means anchoring opposite portions of the runs to the housing at locations on diametrically opposite sides of the slip ring, said wire means being stretched so that compressive force is exerted by said wire means to cause the loop to embrace substantial arcuate portions on opposite sides of the slip ring to define a brush for sliding electrical contact therewith.

9. The invention according to claim 8 wherein the runs embrace arcuate peripheral portions of from 60 to 90 degrees.

10. The invention according to claim 8 wherein the means resiliently contracting the loop comprises coiled members embracing portions of the loop wire.

11. The invention according to claim 8 wherein the helical formations are in the wire throughout the loop.

12. Brushes for slip rings in a rotor and stator combination comprising:

a tubular housing defining a stator;

a rotor comprising a plurality of slip rings stacked axially on and secured to a shaft rotatably mounted coaxially within the stator;

means electrically insulating the slip rings from one another;

a plurality of flexible wire means having opposite portions anchored to the tubular housing at locations diametrically opposite respective slip rings and including opposed runs which when passed on opposite sides of each slip ring periphery define loop brushes therefor, said wire means having helical formations in the runs and being stretched so that compressive force is exerted by the wire means to cause the loop to resiliently embrace substantial arcuate portions on opposite sides of the slip ring to define a brush for sliding electrical contact therewith, said housing formed of dielectric material whereby the brushes are electrically insulated from one another.

13. The invention according to claim 12 wherein adjacent brushes are axially spaced from one another.

14. The invention according to claim 13 wherein the adjacent brushes are anchored to the housing wall at locations helically stepped from one another.

15. The invention according to claim 12 wherein the means resiliently contracting the loops comprises resilient means encircling a portion of the runs adjacent their anchorage to the tubular housing.

16. The invention according to claim 15 wherein the resilient means are coil springs.

17. The invention according to claim 12 wherein the helical formations are disposed throughout the loops.

18. A brush as in claim 1, further including means to apply tension to said flexible wire means.

19. A brush and slip ring arrangement as in claim 9, further including:

means for applying tension to said wire means.

20. Brushes as set forth in claim 12, further including:

means for applying tension to said wire means, said opposed runs embracing peripheral arcs of said slip rings of 60 to 90 degrees on opposite sides of each slip ring.

* * * * *